United States Patent
Wu et al.

(10) Patent No.: US 8,009,824 B2
(45) Date of Patent: Aug. 30, 2011

(54) LINE DRIVER WITH ACTIVE TERMINATION

(75) Inventors: Jiangfeng Wu, Aliso Viejo, CA (US); Tianwei Li, Irvine, CA (US); Arnoldus Venes, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 1339 days.

(21) Appl. No.: 11/590,202

(22) Filed: Oct. 30, 2006

(65) Prior Publication Data
US 2008/0101592 A1 May 1, 2008

(51) Int. Cl.
*H04M 1/00* (2006.01)
(52) U.S. Cl. .................... 379/399.01; 379/394
(58) Field of Classification Search ............ 379/387.01, 379/394, 399.01
See application file for complete search history.

(56) References Cited

U.S. PATENT DOCUMENTS

| | | | | |
|---|---|---|---|---|
| 4,560,834 A * | 12/1985 | Huft | ............................. | 379/324 |
| 6,178,241 B1 * | 1/2001 | Zhou | ............................. | 379/382 |
| 6,788,745 B1 * | 9/2004 | Lim et al. | ...................... | 375/297 |
| 7,202,746 B1 * | 4/2007 | Kejariwal et al. | ............ | 330/301 |

OTHER PUBLICATIONS

Adel S. Sedra and Kenneth C. Smith, Microelectronic Circuits (4th ed. Oxford, 1997), pp. 276-282.*
William H. Hayt, Jr. and Jack E Kemmerly, Engineering Circuit Analysis (5th ed. McGraw-Hill, 1993), pp. 28-33.*

* cited by examiner

*Primary Examiner* — Walter F Briney, III
(74) *Attorney, Agent, or Firm* — Farjami & Farjami LLP

(57) ABSTRACT

A line driver comprises a driving amplifier receiving an input of the line driver, a current sense resistor connected between the driving amplifier output and the line driver output, and a feedback amplifier sensing the voltage across the current sense resistor and providing a corresponding feedback voltage that is proportional to the output current to the driving amplifier, thereby determining an output impedance at the line driver output. Precise output impedance can be realized by using a high precision resistor as the current sense resistor, and using resistive feedback amplifiers with accurate gains as the driving and feedback amplifiers. The resistance of the current sense resistor can be substantially less than the line driver output impedance, and the driving amplifier output voltage swing can be substantially less than twice the line driver output voltage swing.

20 Claims, 5 Drawing Sheets

LINE DRIVER WITH ACTIVE TERMINATION

BACKGROUND OF THE INVENTION

1. Field of the Invention

The present invention is generally in the field of electrical circuits. More particularly, the invention is in the field of line drivers.

2. Background Art

Line drivers, such as voltage mode and current mode line drivers, are typically utilized to drive transmission lines in cell phones, set top boxes, cable modems, DSL modems, and other types of electronic devices. To prevent return loss and signal distortion, a line driver is typically required to provide an output impedance that matches the characteristic impedance of the transmission line. For example, a line driver in a video application is required to provide a 75 Ohm output impedance to drive a 75 Ohm load via 75 Ohm video cables. Although current mode line drivers can provide a desirable performance, they typically have higher power consumption than voltage mode line drivers. As a result, voltage mode line drivers are typically utilized in devices in which power is limited, such as mobile communications devices.

In a conventional implementation, a voltage mode line driver includes a voltage amplifier coupled in series with a termination resistor, which is coupled to a load resistor via a transmission line. To prevent impedance mismatch, the termination resistor should have the same value as the load resistor and the characteristic impedance of the transmission line. However, as a result of the voltage divider formed by the termination resistor and the load resistor, the output voltage provided by the voltage amplifier needs to be twice as large as the output voltage provided at the line driver output, which requires a high power supply voltage. The high power supply voltage required by this conventional voltage mode line driver undesirably increases power consumption.

SUMMARY OF THE INVENTION

A circuit to realize high precision active termination in line drivers, resulting in accurate output impedance, reduced power consumption and improved output linearity. Features, advantages and various embodiments of the present invention are shown in and/or described in connection with at least one of the drawings, as set forth more completely in the claims.

DETAILED DESCRIPTION OF THE INVENTION

The present invention is directed to a line driver with active termination. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention.

The drawings in the present application and their accompanying detailed descriptions are directed to merely exemplary embodiments of the invention. To maintain brevity, other embodiments of the present invention are not specifically described in the present application and are not specifically illustrated by the present drawings.

Figure 1:
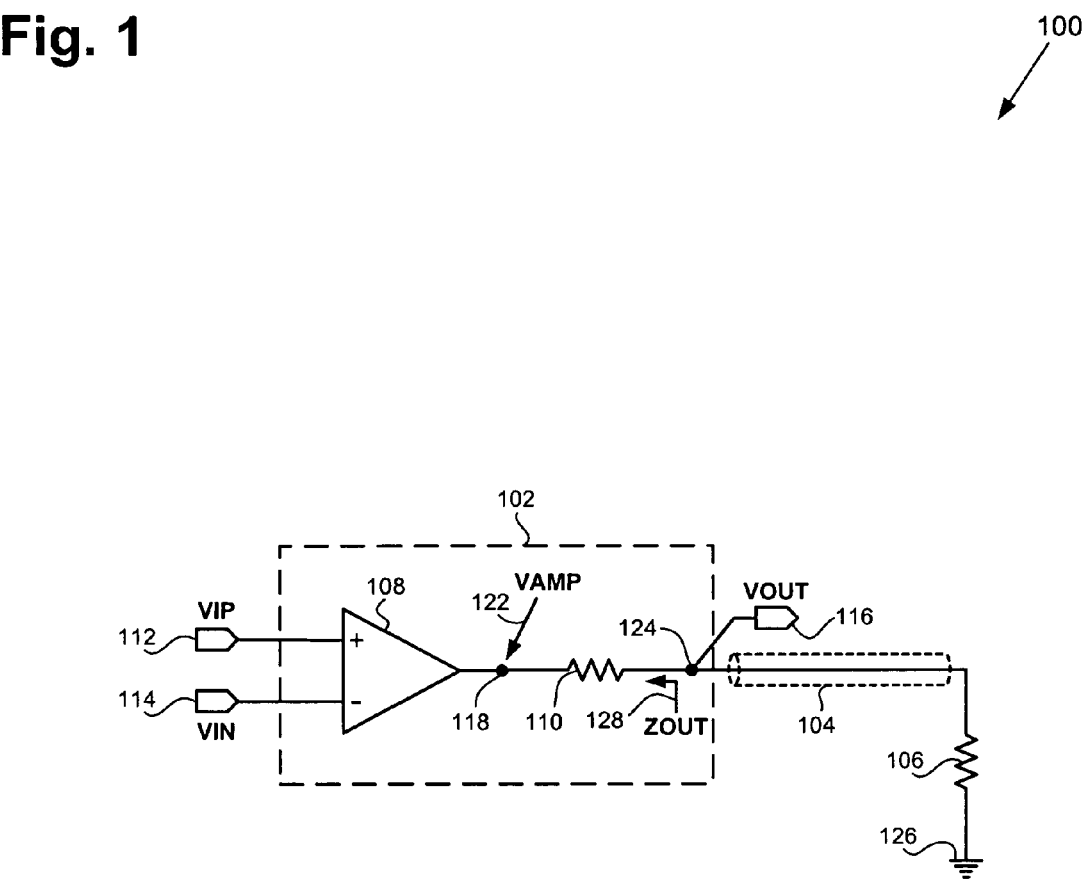
FIG. 1 illustrates a circuit diagram of an exemplary conventional line driver coupled to a load resistor.

FIG. 1 shows a circuit diagram of an exemplary conventional line driver coupled to a load resistor. Circuit 100 includes conventional line driver 102, transmission line 104, and load resistor 106. Conventional line driver 102, which is a voltage mode line driver, includes voltage amplifier 108 and termination resistor 110. Conventional line driver 102 receives differential input voltages VIP 112 and VIN 114 and provides output voltage VOUT 116. Conventional line driver 102 can be utilized in audio, video, and multimedia applications, for example.

As shown in FIG. 1, VIP 112 is coupled to the positive (non-inverting) input of amplifier 108 and VIN 114 is coupled to the negative (inverting) input of amplifier 108. Amplifier 108 should have a gain of 2. Amplifier 108 is configured to receive VIP 112 and VIN 114 at respective positive and negative inputs, amplify the difference between VIP 112 and VIN 114, and provide an output voltage VAMP at node 118, where VAMP, indicated by arrow 122, is equal to 2·(VIP−VIN). Also shown in FIG. 1, a first terminal of termination resistor 110 is coupled to the output of amplifier 108 at node 118 and a second terminal of termination resistor 110 is coupled to node 124, which is the output of conventional line driver 102. Termination resistor 110 provides passive termination for conventional line driver 102.

Further shown in FIG. 1, transmission line 104 is coupled between node 124 and a first terminal of load resistor 106, and a second terminal of load resistor 106 is coupled to ground 126. Load resistor 106, which can be situated in a receiver (not shown in FIG. 1), has resistance RL. RL should be selected to match the characteristic impedance of transmission line 204, which can be 50 Ohm or 75 Ohm, to prevent signal reflection and distortion at the receiver input.

The output impedance ZOUT of line driver 102 at node 124 is indicated by arrow 128 in FIG. 1. The output impedance ZOUT is equal to the resistance of termination resistor 110. To prevent signal reflection and distortion at the driver output, ZOUT should match the characteristic impedance of transmission line 104 and the resistance of load resistor 106, which is RL. Therefore, termination resistor 110 should be equal to RL. For example, termination resistor 110, the characteristic impedance of transmission line 104, and load resistor 106 can each be equal to 75 Ohm, which is the impedance value that is typically used in video applications.

As a result of the voltage divider formed by termination resistor 110 and load resistor 106, which both have equal resistance of RL, VAMP, which is the output voltage provided by amplifier 108 at node 118, must be equal to 2VOUT, which is the output voltage provided by conventional line driver 102 at node 124. Thus, as a result of passive termination provided by termination resistor 110, conventional line driver 102 is required to provide a voltage swing at the output of amplifier 108 that is twice as large as the amplitude of VOUT 116 at node 124. A high power supply voltage is thus required to provide a large voltage swing at the output of amplifier 108 that is twice as large as the amplitude of VOUT 116. If a lower power supply voltage is utilized to provide the required voltage swing for VAMP, the lower power supply voltage can cause nonlinear distortion in VOUT 116. Thus, in order to achieve a sufficiently high voltage swing at the output of amplifier 108 and a linear output voltage with sufficiently low distortion, conventional line driver 102 requires a higher power supply voltage, which undesirably increases power consumption.

Figure 2:
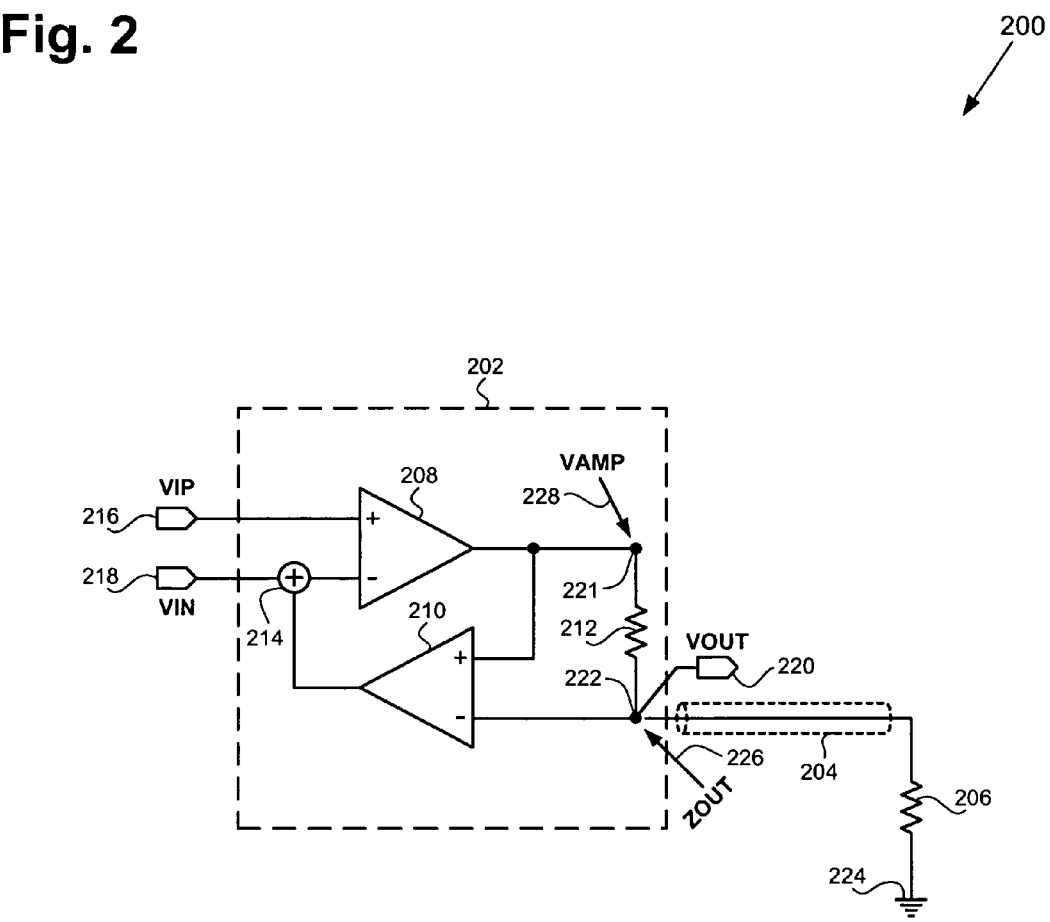
FIG. 2 illustrates a circuit diagram of an exemplary line driver coupled to a load resistor in accordance with one embodiment of the present invention.

FIG. 2 shows a circuit diagram of an exemplary line driver coupled to a load resistor in accordance with one embodiment of the present invention. Circuit 200 includes line driver 202, transmission line 204, and load resistor 206. Line driver 202 comprises driving amplifier 208, feedback amplifier 210, and current sense resistor 212. In the embodiment in FIG. 2, line driver 202 is a voltage mode line driver, which receives differential input voltages VIP 216 and VIN 218 and provides an output voltage VOUT 220. Line driver 202 can be integrated with a DAC (Digital to Analog Converter) such as a video DAC or other devices which can provide an input signal. Line driver 202 can be utilized in mobile devices such as cell phones, as well as other types of devices that require a line driver, such as set top boxes, cable modems and DSL modems.

As shown in FIG. 2, VIP 216 is coupled to the positive (non-inverting) input of driving amplifier 208; VIN 218 and the output of feedback amplifier 210 are coupled to the negative (inverting) input of driving amplifier 208 through summing node 214. As a result of summing node 214, the input voltage provided to the differential inputs of driving amplifier 208 is equal to the difference between the differential input voltage VIP−VIN and the output voltage provided by feedback amplifier 210.

Also shown in FIG. 2, the positive input of feedback amplifier 210 and a first terminal of current sense resistor 212 are coupled to the output voltage of driving amplifier 208, VAMP as indicated by arrow 228, at node 221. The negative input of feedback amplifier 210 and a second terminal of current sense resistor 212 are coupled to the output voltage of line driver 202, VOUT 220, at node 222. Further shown in FIG. 2, a first terminal of transmission line 204 is coupled to the output of line driver 202 at node 222, and a second terminal of transmission line 204 is coupled to load resistor 206.

The output impedance ZOUT of line driver 202 at node 222 is indicated by arrow 226. Under the condition that no substantial current flows into feedback amplifier 210 at node 222, the current flowing through current sense resistor 212 is equal to the current flowing out of line driver 202 onto load resistor 206. Feedback amplifier 210 senses the voltage across current sense resistor 212 and provides an output voltage at the negative input of driving amplifier 208, which is proportional to the current flowing out the line driver 202. Given GD is the gain of driving amplifier 208, GF is the gain of feedback amplifier 210 and RS is the resistance of current sense resistor 212, the relationship between input voltage VIP−VIN, output current IOUT and output voltage VOUT can be described by:

$$GD \cdot (VIP - VIN - GF \cdot RS \cdot IOUT) - RS \cdot IOUT = VOUT \quad \text{equation (1)}$$

The output impedance of line drivers is defined as −VOUT/IOUT when the input voltage VIP−VIN is 0. Therefore, the output impedance ZOUT of line driver 202 is given by:

$$ZOUT = (GD \cdot GF + 1) \cdot RS \quad \text{equation (2)}$$

To match the characteristic impedance of transmission line 204 and the resistance load resistor 206 (RL), current sense resistor 212 should be selected to have a resistance of:

$$RS = RL/(GD \cdot GF + 1) \quad \text{equation (3)}$$

Under above condition, current sense resistor 212 and load resistor 206 form a voltage divider, wherein the output voltage VOUT 220 provided by line driver 202 at node 222 can be represented by:

$$VOUT = \left(\frac{GD \cdot GF + 1}{GD \cdot GF + 2}\right) \cdot VAMP \quad \text{equation (4)}$$

The difference between VAMP and VOUT, which is VAMP/(GD·GF+2), is sensed by feedback amplifier 210 and is multiplied by its gain, which is GF, to obtain the output voltage of feedback amplifier 210. The output voltage of feedback amplifier 210 is then subtracted from the differential input voltage of line driver 202, which is VIP−VIN, to obtain the input voltage of driving amplifier 208. Thus, the output voltage of driving amplifier 208 is given by:

$$VAMP = GD \cdot \left(VIP - VIN - \left(\frac{GF}{GD \cdot GF + 2}\right) \cdot VAMP\right) \quad \text{equation (5)}$$

Equation (5) can be rewritten as:

$$VAMP = \left(\frac{GD \cdot GF + 2}{GD \cdot GF + 1}\right) \cdot \left(\frac{GD}{2}\right) \cdot VIN \quad \text{equation (6)}$$

Equations (1) and (6) can be combined to obtain the equation:

$$VOUT = \left(\frac{GD \cdot GF + 1}{GD \cdot GF + 2}\right) \cdot VAMP = \left(\frac{GD}{2}\right) \cdot (VIP - VIN) \quad \text{equation (7)}$$

Equation (7) defines the relationship between VOUT, VAMP, and VIP−VIN, when line driver 202 output impedance ZOUT matches load resistance RL. The feedback loop formed by driving amplifier 208, feedback amplifier 210 and current sense resistor 212, determines the relationship between VOUT, VAMP, and VIN. According to equation (7), when ZOUT matches load resistance RL, line driver 202 has a gain equal to GD/2.

Equation (4) can be rewritten as:

$$VAMP = \left(\frac{GD \cdot GF + 2}{GD \cdot GF + 1}\right) \cdot VOUT \quad \text{equation (8)}$$

As shown in equation (8), the maximum voltage swing of VAMP at the output of driving amplifier 208 is less than twice the voltage swing of VOUT at output node 222 of line driver 202. In one embodiment, the maximum voltage swing of VAMP can be made substantially less than twice the voltage swing of VOUT by choosing large GD and GF. In contrast, as shown in FIG. 1, the maximum voltage swing of VAMP at the output of amplifier 108 in conventional line driver 102 is twice as large as the voltage swing of VOUT 116 at the output of conventional line driver 102. Thus, compared to conventional line driver 102, which utilizes passive termination, the embodiment of the invention in FIG. 2 utilizes active termination to achieve a line driver having a reduced voltage swing at the output of the driving amplifier, thereby allowing the line driver to operate at a lower supply voltage, and achieve reduced distortion and increased linearity.

In many applications, voltage mode line drivers are typically required to have a voltage gain of 1. In one embodiment, driving amplifier 208 can have a gain of 2 to realize an overall voltage gain of 1 for line driver 202, in accordance with equation (7). In another embodiment, driving amplifier 208 and feedback amplifier 210 can both have a gain of 2. According to equation (2), the resistance of current sense resistor 212 should be equal to RL/5, where RL is the characteristic impedance of transmission line 204 and the resistance of load resistor 206. Thus, the voltage swing of VAMP at the output of driving amplifier 208 is only 20% larger than the voltage swing of VOUT at the output of line driver 202. For example, in video applications where a 75 Ohm cable and a 75 Ohm load are used, current sense resistor 212 has a resistance of 15 Ohm.

In some applications, the matching between the line driver output impedance, the characteristic impedance of transmission line and the load resistor, is required to be precise. For example, in video applications, the matching requirement is 75 Ohm+/−5%. In this invention, as shown in equation (2), current sense resistor 212 is utilized as the reference for the output impedance, and the gains of driving amplifier 208 and feedback amplifier 210 provide the scale factor. The line driver output impedance can be determined accurately if both the resistance of current sense resistor 212 and the gains of driving amplifier 208 and the feedback amplifier 210 can be obtained precisely. Thus, by utilizing a high precision resistor as the current sense resistor, this invention can provide high precision active termination for line drivers. In one embodiment, driving amplifier 208 and feedback amplifier 210 are situated on a semiconductor integrated circuit, while current sense resistor 212 is an external high precision resistor not situated on the semiconductor die. Current sense resistor 212 is connected between two terminals of the semiconductor integrated circuit, wherein the first terminal is coupled to the output of driving amplifier 208, and the second terminal is coupled to the output of line driver 202. In this configuration, the output impedance of line driver 202 is not affected by the resistance variations on the semiconductor die. In other embodiments, line driver 202 can be fully integrated on a semiconductor integrated circuit including current sense resistor 212, or be formed completely by using discrete components including driving amplifier 208 and feedback amplifier 210.

Figure 3:
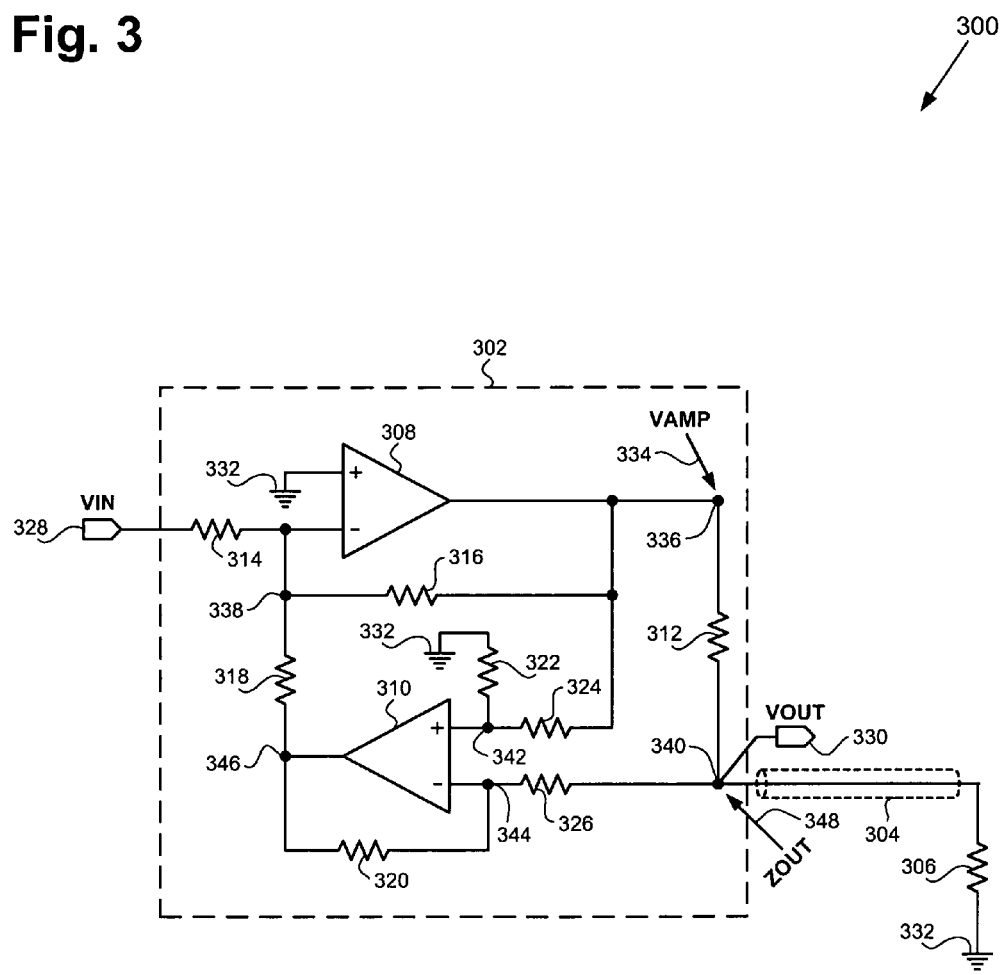
FIG. 3 illustrates a circuit diagram of an exemplary line driver coupled to a load resistor in accordance with one embodiment of the present invention.

FIG. 3 shows a circuit diagram of an exemplary line driver coupled to a load resistor in accordance with one embodiment of the present invention. In FIG. 3, transmission line 304, load resistor 306, and ground 332 in circuit 300 correspond, respectively, to transmission line 204, load resistor 206, and ground 224 in circuit 200 in FIG. 2. Circuit 300 includes line driver 302, transmission line 304, and load resistor 306. Line driver 302 includes operational amplifiers 308 and 310, current sense resistor 312, and resistors 314, 316, 318, 320, 322, 324 and 326. Line driver 302 receives a single-ended input voltage VIN 328 from the negative (inverting) input and provides an output voltage VOUT 330.

In FIG. 3, the driving amplifier, which corresponds to driving amplifier 208 in FIG. 2, comprises operational amplifier 308 and resistors 314, 318 and 316. An operational amplifier is an amplifier which has very large gain and is always used in a feedback loop. This configuration is referred to as a resistive feedback amplifier. Line driver input voltage VIN 328 is coupled to the negative (inverting) input of operational amplifier 308 through resistor 314. The output voltage of the feedback amplifier at node 346 is coupled to the negative (inverting) input of operational amplifier 308 through resistor 318. This arrangement realizes a linear combination of the input voltage VIN 328 and the feedback amplifier output voltage at summing node 338. Resistor 314 and 318 are referred to as the input resistors. The output voltage VAMP 334 of the driving amplifier at node 336 is coupled to the negative (inverting) input of operational amplifier 308 through resistor 316. Resistor 316 is referred to as the feedback resistor. The positive (non-inverting) input of operational amplifier 308 is coupled to ground 332. The driving amplifier is a resistive feedback amplifier with single-ended input. The gain of a resistive feedback amplifier is determined by the resistance ratio between the feedback resistor and the input resistor. For example, resistors 314 and 318 have resistance of R1, resistor 316 has resistance of R2, the gain of the driving amplifier is therefore R2/R1. The large gain of operational amplifier 308 keeps the gain precisely R2/R1 and suppresses nonlinear distortion. The main advantages of the resistive feedback amplifier are excellent gain accuracy and excellent linearity, which are both important in line drivers. In one embodiment, the driving amplifier can have a gain of 2 by choosing the resistance of resistor 314 and 318 to be R and the resistance of resistor 316 to be 2R, thereby making the gain of line driver 302 to be 1 and the output voltage VOUT to be equal to −VIN. In another embodiment, operational amplifier 308 can be a class AB operational amplifier which has high power efficiency when driving a small load resistor, for example, a load resistor of 75 Ohm or 50 Ohm.

In FIG. 3, the feedback amplifier, which corresponds to driving amplifier 210 in FIG. 2, comprises operational amplifier 310 and resistors 324, 326, 322 and 320. As shown in FIG. 3, a first terminal of current sense resistor 312 is coupled to the positive (non-inverting) input of operation amplifier 310 through resistor 324. A second terminal of current sense resistor 312 is coupled to the negative (inverting) input of operational amplifier 310 through resistor 324. The output of operational amplifier 310 is coupled to the negative (inverting) input of operational amplifier 310 through resistor 320. The positive (non-inverting) input of operational amplifier 310 is coupled to ground 332 through resistor 322. The feedback amplifier is a resistive feedback amplifier with differential input, wherein resistors 324 and 326 have the same resistance, and resistors 320 and 322 also have the same resistance. Provided R1' as the resistance of resistors 324 and 326, R2' as the resistance of resistors 320 and 322, the gain of the feedback amplifier is R2'/R1'. In one embodiment, the feedback amplifier can have a gain of 2 by choosing the resistance of resistor 324 and 326 to be R' and the resistance of resistor 320 and 322 to be 2R'. When both the driving and feedback amplifiers have gains of 2 and current sense resistor 312 has a resistance of RL/5, the voltage swing of VAMP 334 at the driving amplifier output is only 20% larger than the voltage swing of VOUT 330 at line driver 302 output, and only 20% of the power is dissipated on current sense resistor 312.

To ensure the output impedance of line driver 302 is accurately determined in accordance with equation (2), the resistance of resistors 324 and 326 must be substantially greater than RL such that no substantial current can flow into the feedback amplifier. As a result, a low power operational amplifier can be used for operational amplifier 310 in the feedback amplifier such that the additional power consumption required for active termination is only a small fraction of the total power consumed by the line driver.

As described above, the accuracy of line driver output impedance depends on the resistance accuracy of the current sense resistor and the gain accuracy of the driving amplifier and the feedback amplifier. In the embodiment shown in FIG. 3, resistive feedback amplifiers are utilized to realize the driving amplifier and the feedback amplifier with precise gains, which in combination with using high precision current sense resistor, achieves precise active termination in the line driver. Another advantage of using resistive feedback amplifiers is that the driving amplifier and the feedback amplifier both have high linearity and constant gain over a large swing range of the output voltage, which leads to a line driver simultaneously having low distortion, accurate gain, and accurate output impedance which remains substantially constant over a large swing range of the output voltage. In semiconductor integrated circuits, the variation of resistance ratio is much smaller than the variation of resistance. Thus, resistive feedback amplifiers are insensitive to resistance variation and can maintain gain accuracy under substantial resistance variation. In one embodiment, all components of line driver 302 except current sensing resistor 312, can be integrated on a semiconductor die, and still achieve accurate gain and output impedance. The embodiment of the invention in FIG. 3 also provides all features and advantages as discussed above for the embodiment of the invention in FIG. 2.

Figure 4:
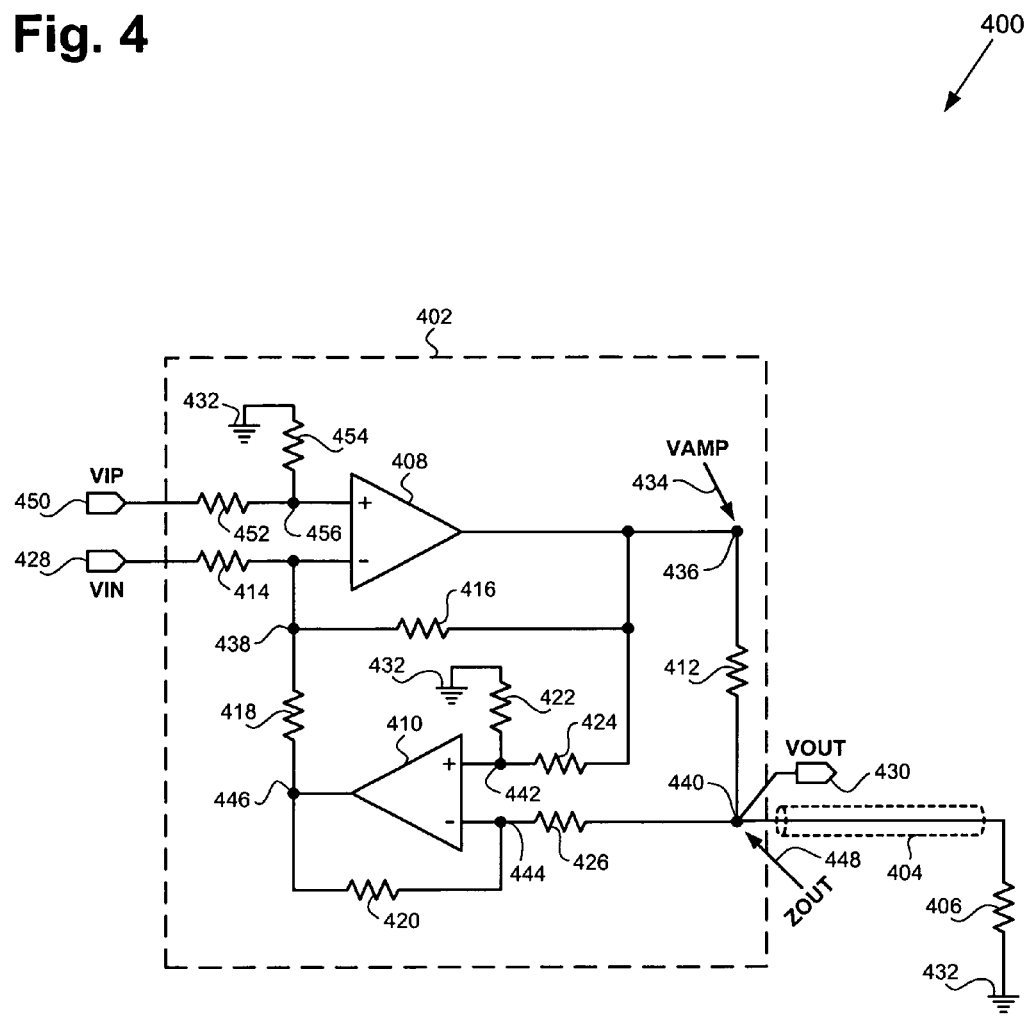
FIG. 4 illustrates a circuit diagram of an exemplary line driver coupled to a load resistor in accordance with one embodiment of the present invention.

FIG. 4 shows a circuit diagram of an exemplary line driver coupled to a load resistor in accordance with one embodiment of the present invention. In FIG. 4, transmission line 404, load resistor 406, operational amplifiers 408 and 410, current sense resistor 412, resistors 414, 416, 418, 420, 422, 424 and 426, VOUT 430, ground 432, and arrows 434 and 448 correspond, respectively, to transmission line 304, load resistor 306, operational amplifiers 308 and 310, current sense resistor 312, resistors 314, 316, 318, 320, 322, 324 and 326, VOUT 330, ground 332, and arrows 334 and 348 in FIG. 3. Line driver 402 includes operational amplifiers 408 and 410, current sense resistor 412, resistors 414, 416, 418, 420, 422, 424, 426, 452 and 454.

Line driver 402 in FIG. 4 is similar to line driver 302 in FIG. 3. In addition to having all features of the embodiment in FIG. 3, line driver 402 receives differential input voltages VIP 450 and VIN 428, and provides an output voltage VOUT 430 at node 440. In the embodiment in FIG. 4, VIN 428 and VIP 450 can be received from a difference signal source, such as a DAC with differential output.

As shown in FIG. 4, VIP 450 is coupled to the positive (non-inverting) input of operational amplifier 408 through resistor 452. The positive (non-inverting) input of operational amplifier 408 is coupled to ground 432 through resistor 454. Resistor 452 and 454 form a voltage divider, wherein the divide ratio should be chosen to make line driver 402 to have equal gain for VIP 450 and VIN 428, with the feedback amplifier being taken into consideration. In one embodiment, resistor 414 and 418 can have a resistance equal to R, resistor 416 can have a resistance equal to 2R, and resistors 452 and 454 should have respective resistances equal to R and 2R/3. This leads to line driver 402 having a gain of 1, wherein VOUT is equal to (VIP−VIN).

In contrast to line driver 302 in the embodiment in FIG. 3, line driver 402 receives differential input signals and provides differential to single-ended conversion. As a result, the embodiment in FIG. 4 allows prior analog signal processing to be performed in differential mode, which advantageously results in increased suppression of power supply noise, interference coupling, and even-order distortion. For example, a DAC with differential output typically has lower distortion and better rejection of power supply noise than a DAC with single-ended output. This advantage is particularly significant in semiconductor integrated circuits. In one embodiment, line driver 402 can be integrated with prior analog signal processing circuits such as a DAC on a semiconductor die, wherein all prior signal processing is performed in differential mode. The line driver in the embodiment in FIG. 4 also provides all features and advantages as discussed above for the line drivers in the embodiments in FIGS. 2 and 3.

Figure 5:
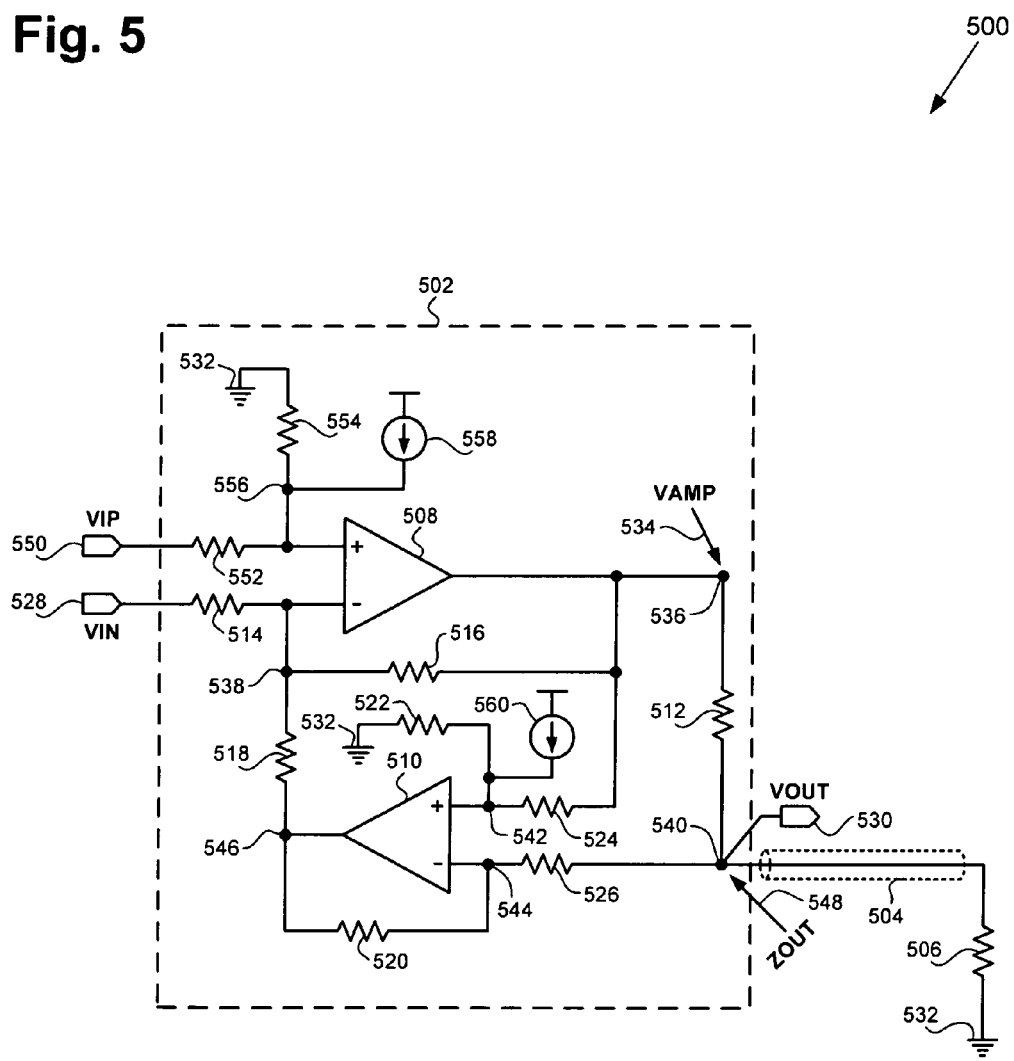
FIG. 5 illustrates a circuit diagram of an exemplary line driver coupled to a load resistor in accordance with one embodiment of the present invention.

FIG. 5 shows a circuit diagram of an exemplary line driver coupled to a load resistor in accordance with one embodiment of the present invention. In FIG. 5, transmission line 504, load resistor 506, operational amplifiers 508 and 510, current sense resistors 512, resistors 514, 516, 518, 520, 522, 524, 526, 552 and 554, VIN 528 and VIP 550, VOUT 530, ground 532, and arrows 534 and 548 correspond, respectively, to transmission line 404, load resistor 406, driving amplifier 408, feedback amplifier 410, resistors 412, 414, 416, 418, 420, 422, 424, 426, 452 and 454, VIN 428 and VIP 450, VOUT 430, ground 432, and arrows 434 and 448 in FIG. 4. Line driver 502 includes operational amplifiers 508 and 510, current sense resistors 512, resistors 514, 516, 518, 520, 522, 524, 526, 552 and 554, and current sources 558 and 560.

Line driver 502 in FIG. 5 is similar to line driver 402 in FIG. 4. In addition to having all features of the embodiment in FIG. 3, line driver 502 includes current source 558 which is coupled to the positive (non-inverting) input of operational amplifier 508 at node 556, and current source 560 which is coupled to the positive (non-inverting) input of operational amplifier 510 at node 542. To convert differential inputs to a single-ended output under a single power supply, an appropriate DC bias voltage needs to be established at node 540 which is the output of line driver 502. Current sources 558 and 560 are utilized to shift the DC level at node 540 to a suitable level between the power supply voltage and ground. Current sources 558 and 560 also provide appropriate input DC bias voltage to operational amplifiers 508 and 510, respectively. The line driver in the embodiment in FIG. 5 also provides all features and advantages as discussed above for the line drivers in the embodiments in FIGS. 2, 3 and 4.

Thus, as discussed above, in the embodiments in FIGS. 2, 3, 4, and 5, the invention provides a voltage mode line driver using active termination to achieve accurate output impedance, accurate voltage gain, and reduced maximum voltage swing, which advantageously reduces power consumption by allowing the line driver to operate at a lower supply voltage and advantageously reduces output distortion.

From the above description of the invention it is manifest that various techniques can be used for implementing the concepts of the present invention without departing from its scope. Moreover, while the invention has been described with specific reference to certain embodiments, a person of ordinary skill in the art would appreciate that changes can be made in form and detail without departing from the spirit and the scope of the invention. Thus, the described embodiments are to be considered in all respects as illustrative and not restrictive. It should also be understood that the invention is not limited to the particular embodiments described herein but is capable of many rearrangements, modifications, and substitutions without departing from the scope of the invention.

Thus, a line driver with active termination has been described.

The invention claimed is:

1. A line driver comprising:
a driving amplifier receiving an input of a line driver;
a current sense resistor coupled between a driving amplifier output and a line driver output;
a feedback amplifier sensing the voltage across the current sense resistor and providing a corresponding feedback voltage to the driving amplifier, thereby producing an output impedance at the line driver output;

wherein the current sense resistor has a resistance substantially equal to RL/(GD·GF+1), wherein GD is a gain of the driving amplifier, GF is a gain of the feedback amplifier, and RL is a load impedance at the line driver output.

2. The line driver of claim 1, wherein a positive input of the feedback amplifier is coupled to the driving amplifier output, a negative input of the feedback amplifier is coupled to the line driver output, and an output of the feedback amplifier is coupled to a negative input of the driving amplifier.

3. The line driver of claim 1, wherein the output impedance at the line driver output is equal to (GD·GF+1)·RS, wherein GD is a RS is a resistance of the current sense resistor.

4. The line driver of claim 1, wherein the line driver has a voltage gain equal to GD/2 when the output impedance at the line driver output is equal to a load impedance.

5. The line driver of claim 1, wherein a voltage at the driving amplifier output is (GD·GF+2)/(GD·GF+1) times a voltage at the line driver output.

6. The line driver of claim 1, wherein the resistance of the current sense resistor is less than the output impedance at the line driver output.

7. The line driver of claim 6, wherein a voltage at the driving amplifier output is less than twice a voltage at the line driver output.

8. The line driver of claim 1, wherein the driving amplifier has a gain of 2.

9. The line driver of claim 8, wherein the line driver has a voltage gain of 1 when the output impedance at the line driver output is equal to the load impedance at the line driver output.

10. The line driver of claim 8, wherein the feedback amplifier has a gain of 2.

11. The line driver of claim 10, wherein the current sense resistor has a resistance equal to ⅕ of the output impedance at the line driver output.

12. The line driver of claim 1, wherein the current sense resistor is a high precision resistor so as to provide an accurate reference for the output impedance.

13. The line driver of claim 12, wherein the driving amplifier and the feedback amplifier are situated on a semiconductor die, and wherein the current sense resistor is not situated on the semiconductor die.

14. The line driver of claim 13, wherein the current sense resistor is coupled between first and second terminals of the semiconductor die, wherein the first terminal is coupled to the driving amplifier output and the second terminal is coupled to the line driver output.

15. The line driver of claim 1, wherein the driving amplifier is a resistive feedback amplifier comprising of an operational amplifier with a high gain and resistors in a feedback configuration.

16. The line driver of claim 1, wherein the feedback amplifier is a resistive feedback amplifier comprising of an operational amplifier with a high gain and resistors in a feedback configuration.

17. The line driver of claim 1, wherein each of the driving amplifier and the feedback amplifier is a resistive feedback amplifier.

18. The line driver of claim 1, wherein the line driver receives differential input voltages and provides a single-ended output voltage, thereby achieving a differential to single-ended conversion.

19. The line driver of claim 1, wherein a positive input of the line driver is coupled to the driving amplifier by a resistive voltage divider, wherein a divide ratio is chosen for the line driver to have equal gains for the positive and negative inputs.

20. The line driver of claim 1 further comprising a first current source coupled to a positive input of the driving amplifier and a second current source coupled to a positive input of the feedback amplifier, to achieve a DC level shift to provide a DC bias voltage at the line driver output and to provide DC input bias voltages for the driving amplifier and the feedback amplifier.

\* \* \* \* \*